UNITED STATES PATENT OFFICE.

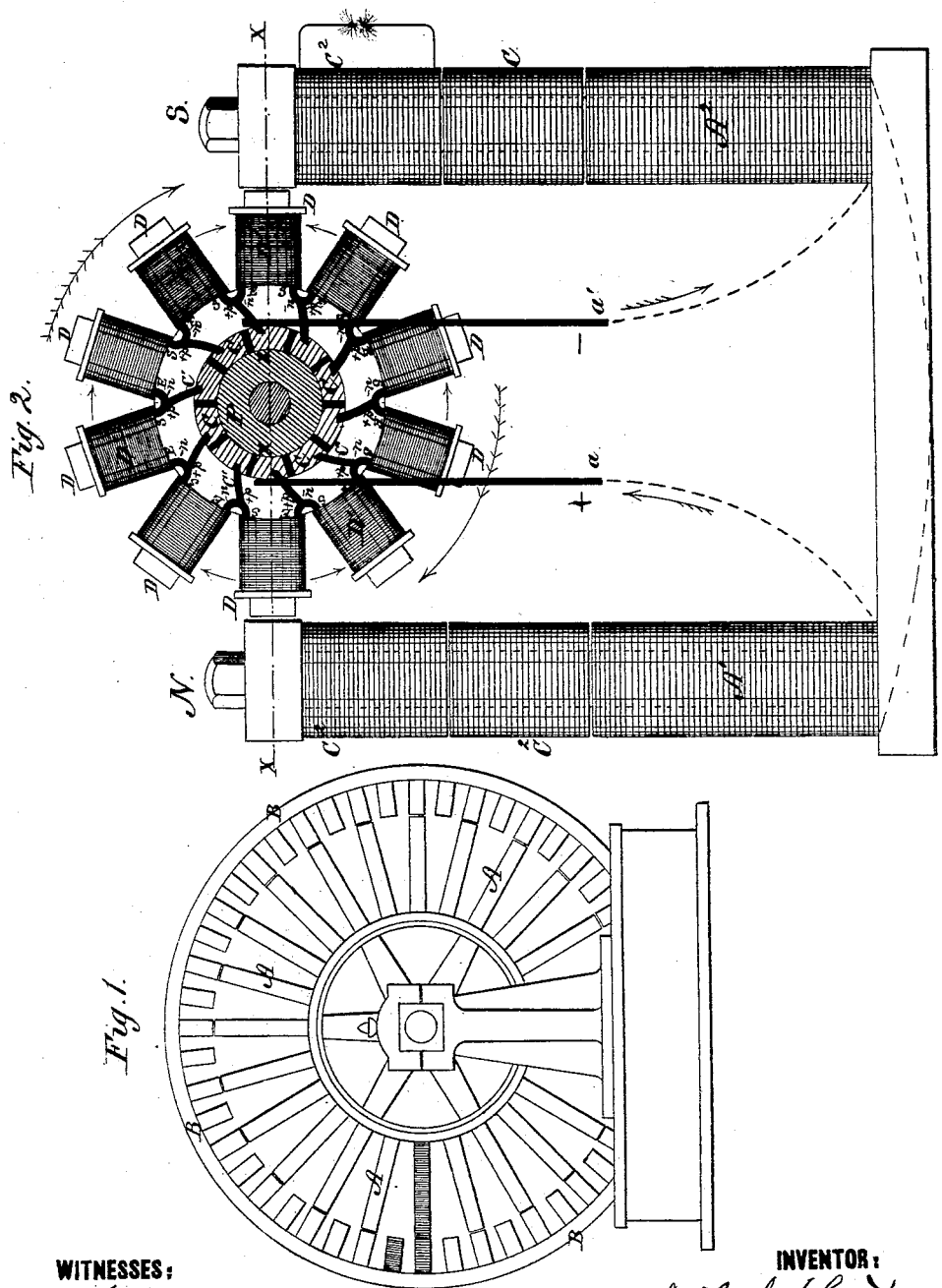

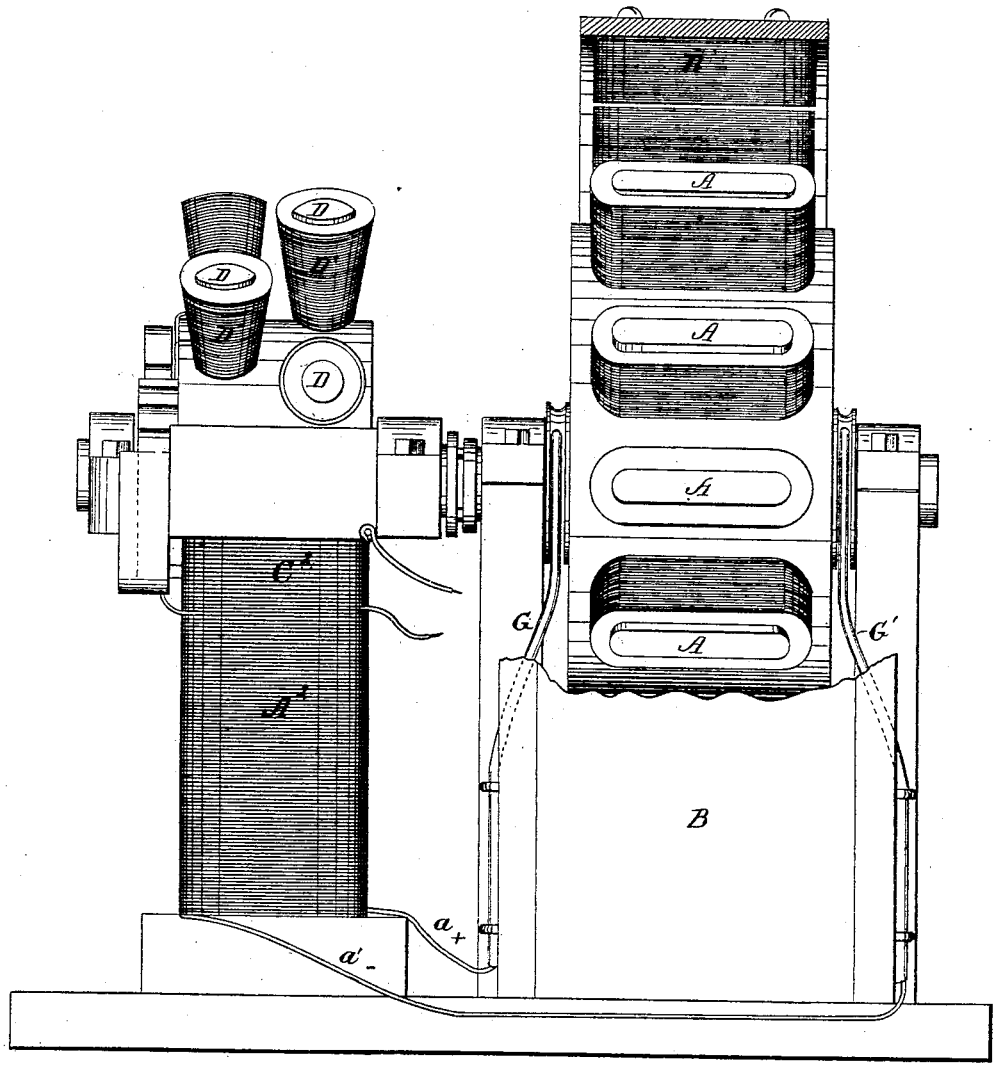

DIEUDONNÉ F. J. LONTIN, OF PARIS, FRANCE.

IMPROVEMENT IN DYNAMO-ELECTRIC MACHINES.

Specification forming part of Letters Patent No. 189,116, dated April 3, 1877; application filed March 1, 1876.

*To all whom it may concern:*

Be it known that I, DIEUDONNÉ FRANÇOIS JOSEPH LONTIN, of Paris, France, chemist, have invented Improvements in Dynamo-Electric Machines; and I do hereby declare that the following is a full, clear, and exact description of the same, reference being had to the annexed sheet of drawings, making a part of the same.

Figures 1 and 2 are side views of the two parts of my device detached; Fig. 3, an end view of the two parts connected with part of the stationary magnets B broken away.

My invention relates to certain improvements in dynamo-electric machines, designed to produce alternate currents in opposite directions, for the production of electric lights or other purposes, as well as currents invariable in direction.

The invention consists, first, in combining a magneto-electric machine, in which the induced magnets are stationary and the inducing-magnets movable, with a dynamo-electric device, hereinafter described, for producing currents invariable in direction, for the purpose of exciting the aforesaid magneto-electric machine; and, secondly, in increasing the length of cores of the stationary inducing electro-magnets of the device employed for producing currents invariable in direction, so as to permit one or more wires to be placed thereon, from which alternate currents in opposite directions may be taken, which arrangement enables me to obtain at once with this machine currents invariable in direction from the induced magnets of the wheel, and also alternate currents in opposite directions from the additional coils upon the lengthened inducing-magnets, without the use of collectors or commutators.

In the drawing, Fig. 1, A represents a series of inducing-magnets, arranged radially about an axis, so as to revolve therewith, while B represents a series of induced magnets, which are made stationary, and project inwardly toward the inducing-magnets. These induced magnets B serve each as so many independent sources of electricity of alternately-reversed currents, and may be utilized for producing any number of electric lights, or for other purposes. To excite them, however, it is necessary that the inducing-magnets A be rotated and charged by an electric current invariable in direction. For thus charging the inducing-magnets A I employ the device for producing said invariable currents, which is illustrated in Fig. 2.

In this case the relation of the induced to the inducing magnets is the reverse of that shown in Fig. 1, in that the inducing-magnets $A^1 A^2$ are here stationary, while the induced magnets of the wheel are movable.

This induction-wheel P consists of a metallic shaft, upon which are arranged radial arms at right angles to the axis, which arms form cores of the magnets $D'$. Each of said cores is provided with a coil of covered copper wire, of which the ingress end E of one coil is connected with the egress end S of the next coil, so as to form a series of induction-coils, connected together in such a way as to produce a circuit completely closed upon itself. The extremities of each of these coils is electrically connected at $C^1$ with insulated contacts C upon the boss of the wheel, and upon which contacts the rubbers or springs $a\ a'$ bear in the line X X, to take off the currents which are invariable in direction.

To understand the effect produced by imparting rotary motion to the induction-wheel in front of the poles of a magnet or electric magnet, it is necessary to refer to the action of magnetism upon coils having iron cores.

In an induction-coil consisting of an iron core with a certain length of copper wire wound around it, the two extremities of the wire constitute the two poles of an instantaneous battery, if the central iron core is submitted momentarily to the influence of a magnet. The current produced is different according as the coil is presented to the north or south pole of the magnet, and according to whether the pole is approaching or receding, which effects may be thus enunciated:

First, when an induction-coil is made to approach a negative pole, there is produced in the wire of the coil an induced electric current in the inverse direction to that of the inductor, (a magnet being considered as a solenoid, according to the theory of Ampère.)

Second, if the same coil is made to recede from the same pole, the direction of the current is reversed. It is then direct—that is to say, in the same direction as that of the inducer.

Third, when an induction-coil approaches the south pole of the magnet, the electric current produced is in the same direction as that which would be produced if it were made to recede from the north pole.

Fourth, when approaching the north pole and receding from the south pole, the effect produced is the same, but inverse as regards general direction to that indicated in clause third.

These four laws being premised, suppose an induction-wheel, P, to be rotated, as before stated. If the axis of this wheel be in the polar line X X of a magnet or electro-magnet, the effect in accordance with the third law will be that all the coils above the polar line produce a current in one direction, as indicated by the small arrows, since they are all approaching the south pole and receding from the north pole. The coils below the polar line, approaching the north pole and receding from the south pole, also produce a current in one direction, but inverse to that of the coils above the line.

The magnetic polar line X X thus really divides the coils of the induction-wheel into two equal series—those above the magnetic polar line and those below the same—while the enveloping-wires of the coil are still connected together, so as to form a completely-closed circuit.

If the electricity generated in the upper series of coils is generated in the opposite direction in the lower series, there will be in the magnetic polar line on the one side a double positive pole, $p\ p$, and on the other a double negative one, $n\ n$, so that if by two conducting rubbers or blades, $a\ a'$, contact with the insulated plates of the coils is established on the line of the double positive pole $p\ p$ and the double negative pole $n\ n$, we have the two poles of a powerful source of electricity, yielding a current invariable in direction; and if I employ a part of the electricity produced to excite the electro-magnets $A^1\ A^2$, as indicated in dotted lines, I secure a constant and automatic supply of electricity of invariable current. The primary source of the current is supplied by the feeble residual magnetism of the electro-magnets $A^1\ A^2$, or by charging them once for all.

The invariable induction-currents, which are at first very weak, are collected by the two rubbers, as they are produced and returned into the electro-magnets $A^1\ A^2$, which thus become gradually stronger, and consequently produce in the coil induction-currents of increasing intensity as the rotation is accelerated. These currents are continuous, and become constant as soon as the speed of rotation is maintained constant.

In constructing the inducing electro-magnets $A^1\ A^2$ I prolong the cores of the same, and locate upon said prolongation separate coils $C^2\ C^2$, in which coils induced alternate currents of opposite direction are produced, so that by the single device illustrated in Fig. 2 both currents invariable in direction are produced, (taken from rubbers $a\ a'$,) and alternate currents in opposite direction, (taken from coils $C^2\ C^2$,) and this, too, without the use of additional rubbers and a commutator for the said alternately-reversed currents.

Now, if a number of separate sources of electricity of alternately-reversed currents is desired for producing any number of electric lights, or for other purposes, the device illustrated in Fig. 1 is combined with that illustrated in Fig. 2, after the manner shown in Fig. 3, and the invariable current which is taken from the rollers $a\ a'$ through the coils $A^1\ A^2$ is passed through the revolving inducing-magnets A by means of additional rubbers $G\ G'$, and the magnets A, being excited thereby, produce, in revolving, alternate currents in opposite direction in the stationary magnet B, each of which constitutes then an independent source of electricity for the production of a number of electric lights, or for similar purpose.

In defining the limits of my invention I would state that I do not claim, broadly, the making of the inducing-magnets A movable and the induced magnets B stationary, as this is not new; neither do I claim, broadly, the means described and illustrated in Fig. 2 for producing currents invariable in direction, as this general idea is shown in the United States Patent to J. B. Fuller, October 19, 1875, No. 168,893; but,

Having thus described my invention, what I claim as new is—

1. The combination, with a set of movable induced magnets, of a stationary inducing-magnet having its cores extended, and provided with one or more separate coils, from which alternate currents in opposite directions may be taken, substantially as and for the purpose described.

2. The combination of the inducing electro-magnets $A^1\ A^2$, having extended cores and independent coils $C^2$, with the induction-wheel P, having induced magnets $D'$, arranged as described, and the rubbers $a\ a'$, forming electrical connection between the coils of the inducing-magnet $A^1\ A^2$ and the coils of the induced magnets, substantially as described.

3. The combination, with the revolving inducing-magnets A and the stationary induced magnets B, of the stationary inducing-magnets $A^1\ A^2$ and the revolving induced magnets $D'$, arranged as described, together with the conducting-rubbers $a\ a'$, which make contact with the induced wheel in the polar line, and conduct the currents invariable in direction to the revolving inducing-magnets A, for the purpose of charging the same, substantially as and for the purpose described.

DIEUDONNÉ FRANÇOIS JOSEPH LONTIN.

Witnesses:
ROBT. M. HOOPER,
F. ORET.